US009844097B2

(12) United States Patent
Pottie et al.

(10) Patent No.: US 9,844,097 B2
(45) Date of Patent: Dec. 12, 2017

(54) HEATING ASSEMBLY FOR A THERMOSTATIC VALVE AND CORRESPONDING PRODUCTION METHOD, AND A THERMOSTATIC VALVE COMPRISING SUCH AN ASSEMBLY

(71) Applicant: Vernet, Ollainville (FR)

(72) Inventors: Nicolas Pottie, Sainte Genevieve des Bois (FR); Guillaume Gautier-Graindorge, Montigny le Bretonneux (FR)

(73) Assignee: VERNET, Ollainville (FR)

( * ) Notice: Subject to any disclaimer, the term of this patent is extended or adjusted under 35 U.S.C. 154(b) by 17 days.

(21) Appl. No.: 14/652,059

(22) PCT Filed: Dec. 13, 2013

(86) PCT No.: PCT/EP2013/076525
§ 371 (c)(1),
(2) Date: Jun. 12, 2015

(87) PCT Pub. No.: WO2014/090986
PCT Pub. Date: Jun. 19, 2014

(65) Prior Publication Data

US 2015/0323090 A1 Nov. 12, 2015

(30) Foreign Application Priority Data

Dec. 14, 2012 (FR) ...................................... 12 62081

(51) Int. Cl.
*F16K 49/00* (2006.01)
*H05B 3/42* (2006.01)
*H05B 3/06* (2006.01)

(52) U.S. Cl.
CPC ................. *H05B 3/42* (2013.01); *H05B 3/06* (2013.01); *H05B 2203/014* (2013.01); *Y10T 137/6606* (2015.04)

(58) Field of Classification Search
CPC ...... H05B 2203/014; H05B 3/06; H05B 3/42; F16K 31/025; Y10T 137/6606
(Continued)

(56) References Cited

U.S. PATENT DOCUMENTS

| | | | | |
|---|---|---|---|---|
| 3,719,795 A * | 3/1973 | Bolomier | A61H 33/12 392/395 |
| 3,747,627 A * | 7/1973 | Christie | F16K 31/36 137/102 |

(Continued)

FOREIGN PATENT DOCUMENTS

| | | |
|---|---|---|
| DE | 203 08 941 U1 | 10/2003 |
| EP | 0 853 267 A1 | 7/1998 |

(Continued)

OTHER PUBLICATIONS

Preliminary Search Report in corresponding French Application No. 1262081, dated Aug. 8, 2013.

*Primary Examiner* — Umashankar Venkatesan
(74) *Attorney, Agent, or Firm* — Knobbe, Martens, Olson & Bear, LLP

(57) ABSTRACT

This heating assembly comprises a thermally conductive tube (42), to be immersed in a thermally expandable material of a thermostatic element of a valve, an electric heating resistor disposed inside the tube and from which there extend electrically conductive wires (62), and a unitary housing (1) made from plastic, through which the fluid to be regulated flows via the valve, and which is secured by over-molding of a longitudinal end portion (44) of the tube. In order to make the molding of the over-molded housing simple and inexpensive to carry out, while being easy to
(Continued)

adapt to various geometric forms of the heating assembly, the invention proposes that, before the housing is molded, a reinforcement (7) for supporting the wires outside the tube, which is separate from the housing, and to which the housing is secured by over-molding, can be securely mounted on the end portion of the tube and supports the wires outside the tube, said wires being externally mounted on the reinforcement, and, when the housing is being molded, keeps the wires in place while the plastic material of the housing coats these wires, the reinforcement and the end portion of the tube.

19 Claims, 6 Drawing Sheets

(58) Field of Classification Search
USPC .......................................................... 137/341
See application file for complete search history.

(56) References Cited

U.S. PATENT DOCUMENTS

| | | | | | |
|---|---|---|---|---|---|
| 4,153,326 | A * | 5/1979 | Frantz | H01R 13/28 439/293 |
| 4,931,625 | A * | 6/1990 | Marlinski | H05B 3/34 219/212 |
| 5,170,752 | A * | 12/1992 | Binversie | F01P 11/04 123/41.08 |
| 7,275,697 | B2 * | 10/2007 | Roman | G05D 23/023 137/591 |
| 7,520,446 | B2 * | 4/2009 | Maraux | F01P 7/167 236/100 |
| 7,878,868 | B2 * | 2/2011 | Mech | H01R 4/38 439/101 |
| 8,217,319 | B2 * | 7/2012 | Pottie | G05D 23/022 219/482 |
| 8,453,943 | B2 | 6/2013 | Pottie et al. | |
| 2002/0070367 | A1 * | 6/2002 | Friesenhahn | F01P 7/167 251/11 |
| 2010/0230504 | A1 * | 9/2010 | Pottie | G05D 23/022 236/93 R |
| 2013/0140296 | A1 * | 6/2013 | Mas | H05B 3/44 219/534 |

FOREIGN PATENT DOCUMENTS

| | | | |
|---|---|---|---|
| EP | 1 545 158 | A2 | 6/2005 |
| WO | WO 2011/010051 | A1 | 1/2011 |
| WO | WO 2012/013896 | A1 | 2/2012 |
| WO | WO 2012/013897 | A1 | 2/2012 |

* cited by examiner

HEATING ASSEMBLY FOR A THERMOSTATIC VALVE AND CORRESPONDING PRODUCTION METHOD, AND A THERMOSTATIC VALVE COMPRISING SUCH AN ASSEMBLY

FIELD OF THE INVENTION

The present invention relates to a heating assembly for a thermostatic valve, as well as a method for manufacturing such a heating assembly. It also relates to a thermostatic valve comprising one such heating assembly.

BACKGROUND OF THE INVENTION

In many applications in the fluids field, in particular for cooling vehicle heat engines, thermostatic valves are used to distribute a fluid entering various circulation channels, based on the temperature of that fluid. These valves are said to be thermostatic because the movement of their inner closure member(s) is controlled by a thermostatic element, i.e., an element that comprises a cup containing a thermally expanding material and a piston able to slide relative to the cup under the action of the thermally expanding material when the latter expands.

To distribute the fluid as a function of other parameters, in particular conditions outside the valve, such as the ambient temperature or the load of the vehicle propelled by the engine equipped with the valve, it is known to incorporate electric heating of the thermally expandable material into the valve, which makes it possible to control the valve from outside it, independently of or in addition to the temperature of the incoming fluid, in particular using an onboard computer in the vehicle programmed appropriately. In practice, a heating resistance is arranged inside the aforementioned piston or a similar tube: for example, by immobilizing the piston in the moving case of the valve, the power supply of the resistance causes the temperature of the thermally expanding material to increase, which, by extension of the latter, causes the cup to slide around the piston, a closure member being supported by that cup to act on the flow of fluid through the valve.

To provide electricity to the heating resistance, one possibility, known from DE-A-103 03 133, consists of the electrically conductive wires, which extend from the resistance to the outside of the aforementioned tube while passing through a terminal part of the latter, and the free ends of which are electrically connected to connecting steps to be connected to an external current source, being directly coated with the plastic material of the housing during molding of the latter around the aforementioned terminal part of the tube. However, this solution is delicate to manufacture, since during molding of the case, the plastic material injected so as to overmold the terminal part of the tube tends to pull, or even pull out, the electrical wires, unless sophisticated and therefore expensive injection molds are used, which furthermore need to be modified when the arrangement of the wires is changed, typically depending on the position, on the case, of the aforementioned connecting pads.

EP-A-0,853,267 proposes overmolding both the terminal part of a heating tube, similar to what is mentioned above, and the electrical wires that leave that tube, with a plastic coating material, so as to form a module, which is next attached in a single piece to the rest of the thermostatic valve, by screwing a thread formed by that plastic material in a complementary tapping, formed by the housing of the valve. The implementation of this solution has the same drawbacks as above, during the injection of the aforementioned plastic coating material.

WO-A-2011/010051 mentions a possible pre-injection of plastic around electrical wires similar to those mentioned thus far, but only at the end of those wires, at which they are electrically connected to connecting studs. This pre-injection is followed by an injection of plastic to form the housing of the valve, then coating all of the rest of the wires, extending outside the tube, as well as the terminal part of the tube.

SUMMARY OF THE INVENTION

The aim of the present invention is to propose a heating assembly in which molding of the overmolded housing is simple and cost-effective to perform, while being easy to adapt to various heating assembly geometries.

To that end, the invention relates to a heating assembly for a fluid control thermostatic valve, comprising:

a tube, being thermally conductive, having a longitudinal central axis and being able to be plunged in a thermally expandable material of a thermostatic element of the valve, an electric heating resistance, which is positioned inside the tube and from which electrically conducting wires extend outside the tube, a single-piece housing made from a plastic material, through which the fluid flows and which is secured by overmolding to a terminal longitudinal part of the tube, and a framework for supporting the conductive wires outside the tube, the framework being separate from the housing, the tube being secured to the framework by overmolding.

The framework is suitable, before molding of the housing, for being fixedly attached to the terminal longitudinal part of the tube and for supporting the conductive wires outside the tube, those conductive wires being outwardly assembled on the framework. The frame work is also suitable, during molding of the housing, for keeping the conductive wires in place while the plastic material of the housing coats those conductive wires, the framework and the terminal longitudinal part of the tube.

One of the ideas at the base of the invention is to keep the electrical wires leaving the tube in place, at least during the injection of plastic material to overmold the housing. The invention is thus based on the presence of a framework for supporting the wires outside the tube, which is placed before molding the housing, while being fixedly attached to the terminal part of the tube, for example by cooperating with that terminal part through complementary shapes. During the molding of the housing, the framework keeps the wires in place outside the tube, thus protecting them from any excess stress applied by the injected plastic material. This framework, jointly with the wires and the terminal part of the tube, is then coated by the injected plastic material. Owing to the invention, the overmolding of the housing may be done simply and quickly, using a standard mold and in an automated manner, without running the risk of damaging the wires and/or separating them from their pre-molding position. Advantageously, the framework according to the invention makes it possible to modify the arrangement of the wires before molding to adapt to various geometries of heating assemblies.

According to other advantageous features of the heating assembly according to the invention:

the framework is made in a single piece;

the framework has an elongated overall shape, which extends lengthwise, at least for a part thereof turned toward the tube, in a transverse or substantially radial direction with respect to the axis;

an end part of the framework, turned toward the tube, is configured to surround and fasten itself, in particular by cooperating through complementary shapes, to a free, outwardly flared end of the terminal longitudinal part of the tube;

between an end part of the framework turned opposite the tube and a running part of the framework, the framework includes a flexible zone, in particular thinner, suitable for being deformed so as to adjust the relative positioning between that end part and the rest of the framework before molding the housing;

in an end part of the framework turned opposite the tube, the framework has through holes for complementary reception of electrical connecting studs that are respectively electrically connected to the conductive wires before molding of the housing;

a running part of the framework, which connects end parts thereof turned toward and opposite the tube, respectively, to each other, delimits a longitudinal trough for receiving the conductive wires, in which the wires run lengthwise between the end parts of the framework and which is provided with means for keeping those conductive wires in place before molding the housing;

the heating assembly further comprises a single sealing gasket, which is an O-ring or a four-lobed seal, which is both inserted radially between the housing and the tube and arranged axially against an end part of the framework, turned toward the tube.

The invention also relates to a fluid control thermostatic valve, comprising:

a heating assembly as defined above, a valve housing consisting at least partially of the housing of the heating assembly, a closure member for regulating the flow of a fluid through the valve housing, and a thermostatic element, comprising a stationary part fixedly connected to the valve housing, and a moving part that bears the closure member and is movable relative to the stationary part under the expansion action of a thermally expanding material in which the tube of the heating assembly is plunged.

The invention further relates to a method for manufacturing a heating assembly for a fluid control thermostatic valve, wherein a tube is provided, that is thermally conductive, has a longitudinal central axis and is suitable for being plunged in a thermally expanding material of a thermostatic element of the valve and in which an electrical heating resistance is positioned from which electrically conductive wires extend outside the tube. A framework, on which the conductive wires outside the tube are outwardly assembled so as to support those conductive wires, is fixedly attached to a terminal longitudinal part of the tube. Then a single-piece housing, that is made from a plastic material and through which a fluid is intended to flow, is secured simultaneously to the terminal longitudinal part of the tube, the framework and the conductive wires outside the tube, by coating the terminal longitudinal part of the tube, the framework and the conductive wires outside the tube, those conductive wires being kept in place by the framework during molding of the plastic material.

The method according to the invention makes it possible to manufacture a heating assembly as defined above.

BRIEF DESCRIPTION OF THE DRAWINGS

The invention will be better understood upon reading the following description, provided solely as an example and done in reference to the drawings, in which.

DETAILED DESCRIPTION OF THE PREFERRED EMBODIMENT

FIGS. 1 to 6 show a thermostatic valve comprising a housing 1 made from plastic, in which a fluid is designed to flow, in a manner regulated by the other components of the valve, in particular oil or a coolant liquid when the valve belongs to a cooling circuit for a heat engine.

Figure 1:
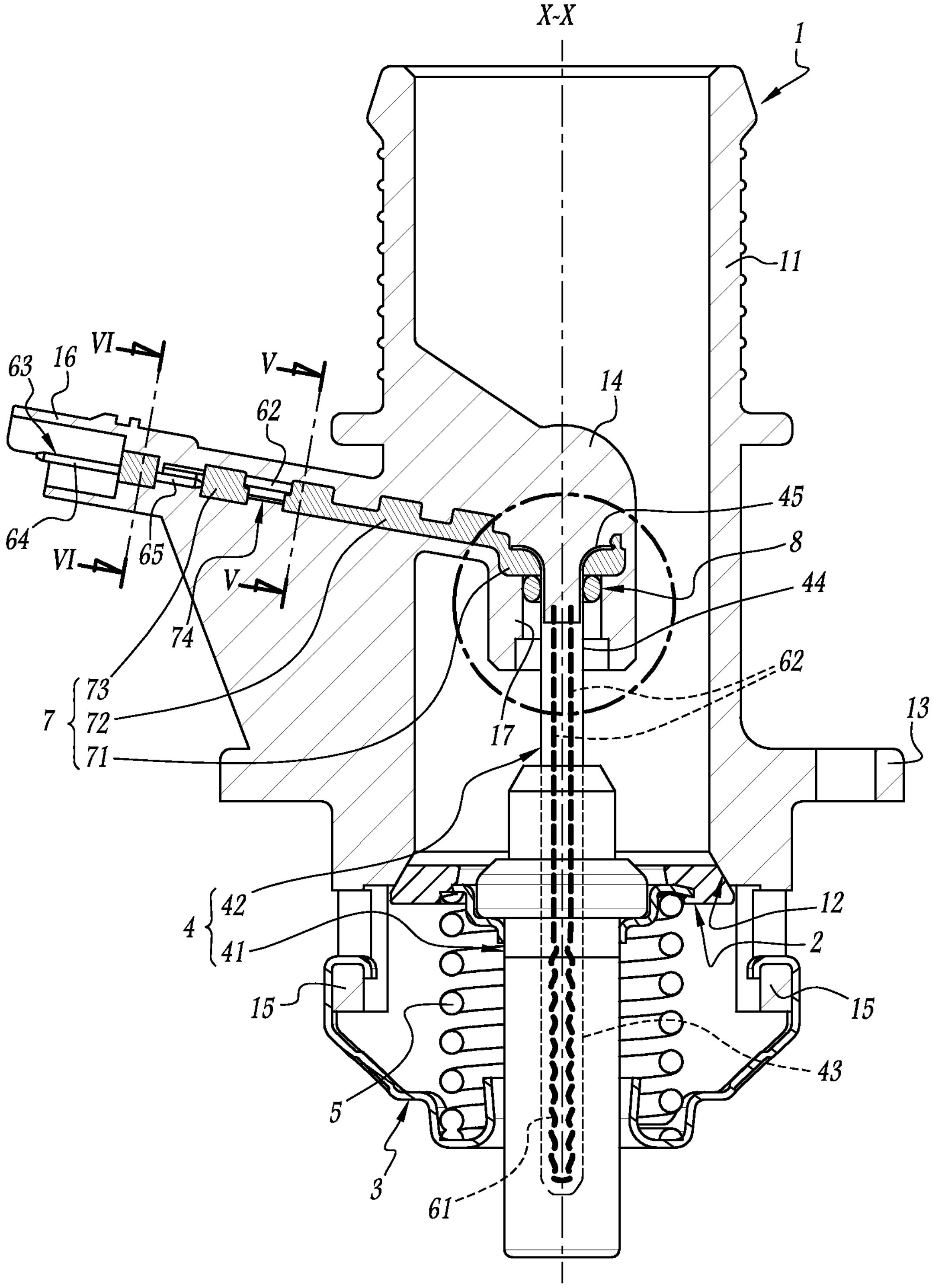
FIG. 1 is a longitudinal cross-section of a thermostatic valve according to the invention.

The housing 1 comprises a tubular single-piece main body 11, here with a globally rectilinear shape centered around an axis X-X belonging to the cutting plane of FIG. 1. During use, the aforementioned fluid flows through the body 11, between its two longitudinal ends, while being regulated, here at one of said ends, by a closure disk 2 centered on the axis X-X and translatable along the axis: when this closure member is pressed tightly against a seat 12 delimited by the aforementioned end of the body 11, as shown in FIG. 1, the flow of the fluid is interrupted, whereas when the closure member 2 is separated from the seat 12, the fluid can flow freely around the closure member and thus enter or leave the body 11.

In practice, various embodiments can be considered regarding the body 11 and the closure member 2, without limiting the invention. Advantageously, the housing 1 comprises an annular flange 13 orthoradially surrounding the body 11, while being made in a single piece with that body.

In order to control the movement of the closure member 2, the thermostatic valve comprises a thermostatic element 4 comprising, in a manner well known in the field, a cup 41 on the one hand, which contains a thermally expandable material, not shown in figures, and around which the closure member 2 is securely fastened, for example by fitting, and a piston 42 on the other hand, which is partially plunged in the cup 41 and translatable along its central longitudinal axis under the action of the expansion of the thermally expandable material contained in that cup. The thermostatic element is arranged across from the housing 1 such that on the one hand, its piston 42 is substantially centered on the axis X-X, and on the other hand, that piston is fixedly connected to the body 11, here at a plastic arm 14 that is a single piece with the body 11 and that extends, through the inside of the body 11, from a portion of that body 11, as clearly shown in FIGS. 2 and 3 and as specified in more detail below. Thus, during use, the piston 42 is stationary relative to the housing 1, while the cup 41 and the closure member 2 that it supports are movable along the axis X-X relative to the housing, under the effect of the thermally expandable material when the latter expands, or when that material contracts, under the opposite effect of a returns spring 5 interposed between the closure member 2 and a stirrup 3 which, during use, is fixedly connected to two tabs 15 integral with the flange 13. In a manner known in itself, these movements are guided along the piston 42, typically by a guide part secured to the cup 41.

For convenience, the rest of the description is oriented relative to the axis X-X: the terms "lower" and "bottom" describe an axial direction oriented toward the cup 41 of the thermostatic element 4, while the terms "upper" and "top" describe an opposite direction.

The thermostatic valve comprises an electric heating resistance 61 which, as shown in dotted lines in FIG. 1, is arranged inside the piston 42, made to that end in the form of a metal tube, here with a circular base, such that said resistance 61 occupies the lower terminal part 43 of the piston 42, i.e., its terminal part plunged in the cup 41, so that the resistance 61 can heat the thermally expandable material contained in that cup.

Figure 4:
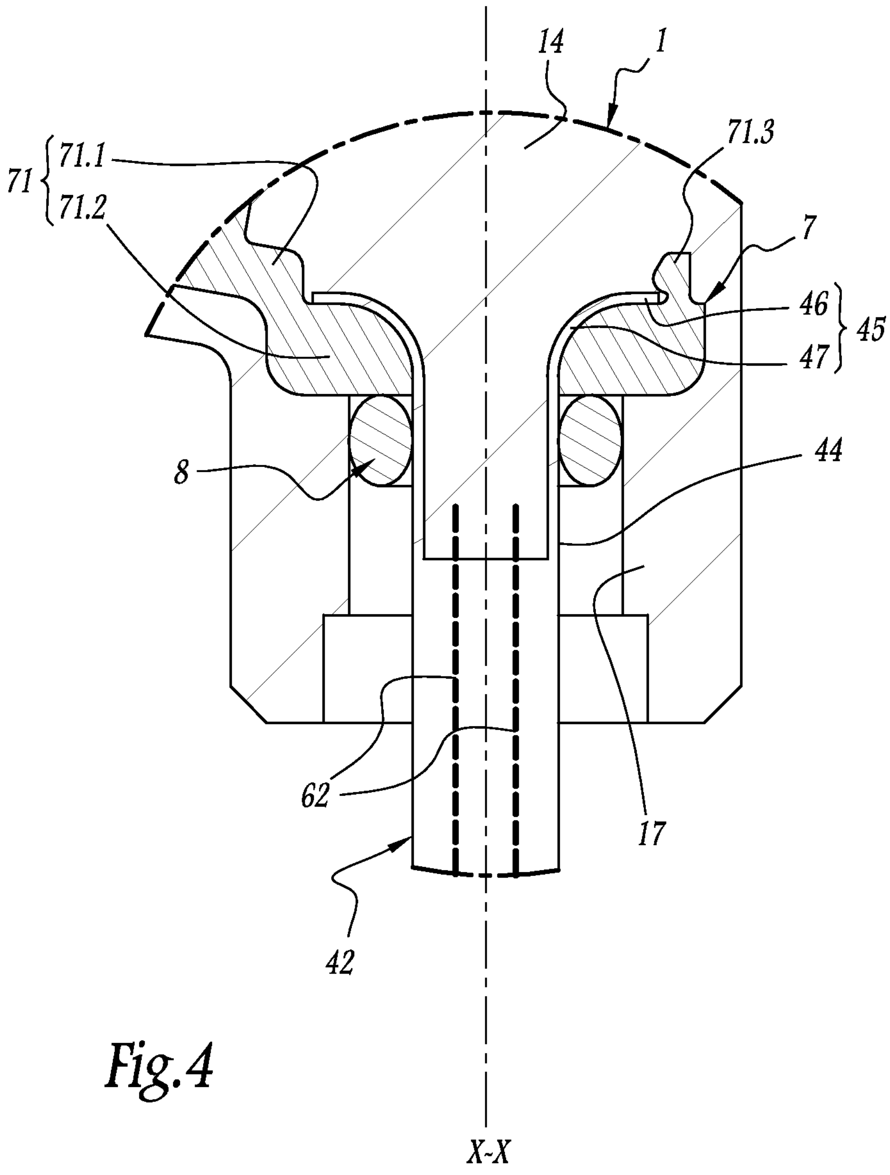
FIG. 4 is an enlarged view of the circled detail IV in FIG. 1.
Figure 5:
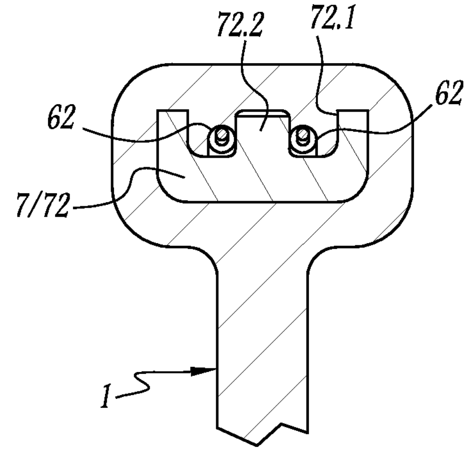
FIGS. 5 and 6 are cross-sections along lines V-V and VI-VI of FIG. 1, respectively.

In its upper terminal part 44, the piston 42 is configured with an outwardly flared free end 45: as clearly shown in FIG. 4, this flared end 45 is made up of a stepped wall 46, globally fitted into a plane perpendicular to the axis X-X, and a horn-shaped wall 47, connecting, while gradually narrowing, the inner end of the stepped wall 46 to the upper end of the rest of the terminal part 44. Advantageously, the stepped wall 46 and the horn-shaped wall 47 here form a single piece with the rest of the terminal part 44, while in particular being obtained by stamping the free end 45. As an alternative that is not shown, the stepped wall 46 can be extended or even replaced by a wall with a raised shape, for example cylindrical, centered on the axis X-X.

Figure 2:
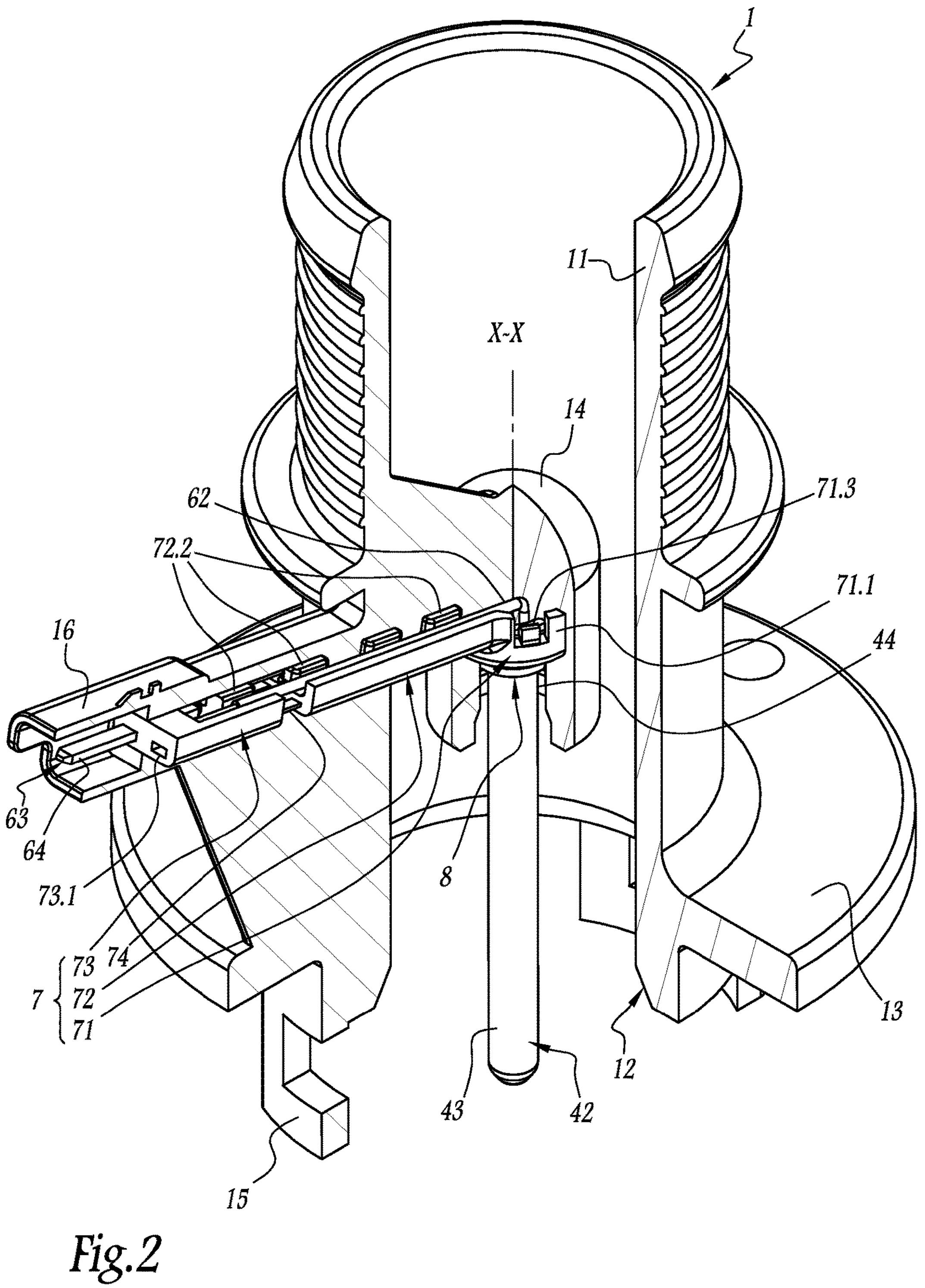
FIGS. 2 and 3 are perspective, cross-sectional quarter views of the valve of FIG. 1.
Figure 3:
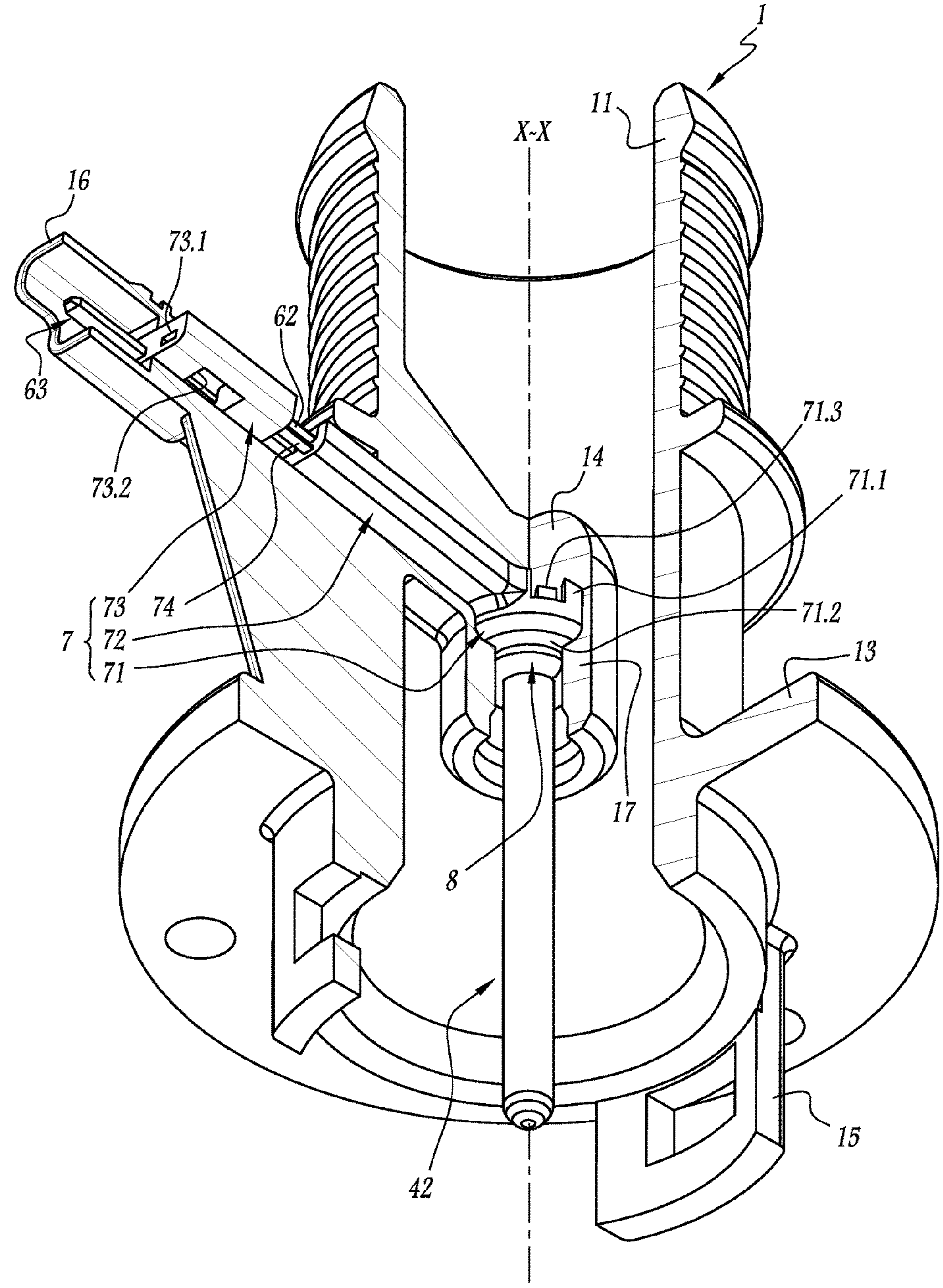
Figure 7:
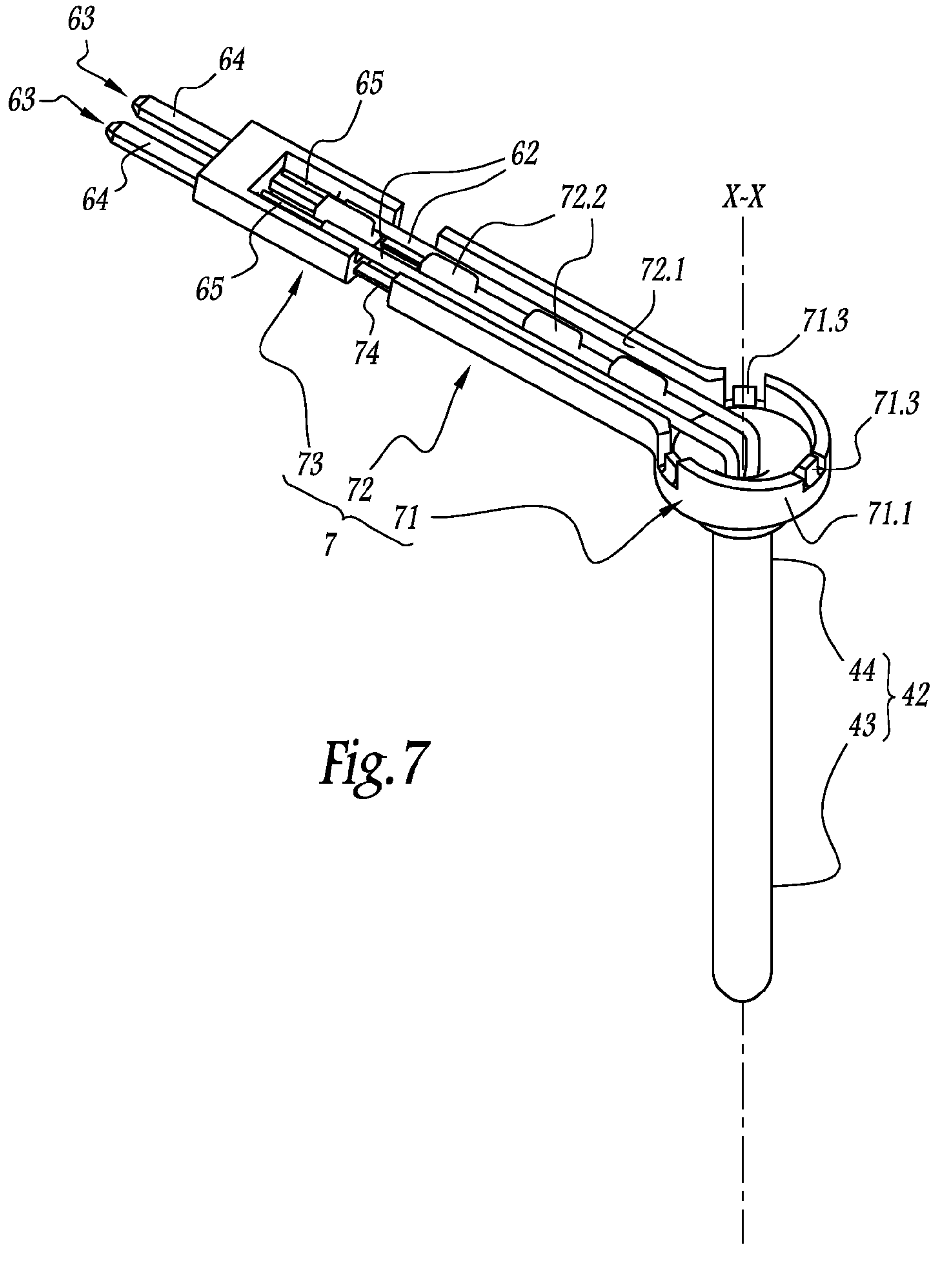
FIG. 7 is a perspective view, showing a subassembly to be overmolded, belonging to the valve of FIG. 1 and comprising a thermally conductive tube positioned in a framework so as to be inserted into a mold for producing the housing of the valve.

In order to electrically connect the heating resistance 61 and external current source, two electrically conductive wires 62 are connected to that resistance 61 and extend from the latter to the outside of the piston 42, while passing through the upper terminal part 44 of the latter, in which the wires 62 emerge upwardly, as clearly shown in FIG. 2 and FIG. 7, in which several components of the thermostatic valve have been omitted for greater clarity related to the following considerations. The respective parts of the wires 62 outside the piston 42 extend from the terminal part 44 of the latter to the connecting studs 63, to which the wires 62 are respectively electrically connected and the free ends 64 of which, i.e., those turned opposite the wires 62, are accessible outside the housing 1 to be connected to the aforementioned external current source. It will be noted that, for visibility reasons, only one of the studs 63 is shown in FIGS. 2 and 3. In practice, the respective ends 65 of the studs 63, opposite their end 64, are respectively connected to the ends of the wires 62, opposite the heating resistance 61, by any appropriate means, for example by welding, crimping or brazing. The stud ends 64 are left stripped, advantageously remotely surrounded by a base 16 for connecting to the external current source, that base 16 advantageously being made in a single piece with the body 11 of the housing 1.

According to the invention, the portion of the conductive wires 62 outside the piston 42 is not embedded alone in the plastic material making up the housing 1. On the contrary, as clearly shown in FIGS. 2 to 7, the thermostatic valve further comprises a framework 7 designed to support the wires 62 outside the piston 42, that framework 7 being separate from the housing 1, inasmuch as, as shown in FIG. 7, that framework 7 is made in the form of one or more parts, in the case at hand a single part, which are not integral with the housing 1.

This framework 7 has an elongated overall shape that extends lengthwise in a direction transverse to the axis X-X, or a substantially radial direction, as in the example considered in the figures. Thus, the framework 7 includes, in its longitudinal direction, an end part 71 turned toward the axis X-X, a running part 72 and an end part 73, opposite its end part 71.

The end part 71 of the frame 7 is designed to be fixedly attached to the upper terminal part 44 of the tube 42 independently of the other components of the thermostatic valve, in particular for molding of the housing 1. In the example embodiment considered in the figures, this end part 71 comprises a globally tubular body 71.1, which is suitable for being arranged all around the flared end 45 of the upper terminal part 44 of the piston 42 and which has, at its lower axial end, a stepped rim 71.2, turned toward the axis X-X and forming an axial downward bearing for the stepped wall 46 and the horn-shaped wall 47 of that piston end 45, as clearly shown in FIG. 4. Furthermore, in its upper end part, the tubular body 71.1 is provided with hooks 71.3, of which there are three in the example embodiment considered here and which are suitable for clipping to the piston end 45, while cooperating with respective portions of the stepped wall 46 of the piston end 45 so as to axially upwardly block that stepped wall 46 and thereby maintaining that stepped wall and the horn-shaped wall 47 bearing axially downward against the rim 71.2 of the end part 71 of the framework 7.

Of course, forms other than those described above can be considered for the end part 71 of the framework 7, as long as that end part 71 has arrangements allowing it to be fixedly connected to the upper terminal part 44 of the piston 42 before molding of the housing 1, if applicable by adapting to geometries other than that of the flared end 45 shown in the figures.

The running part 72 of the framework 7 is designed so as, before molding of the housing 1, to allow the part of the conductive wires 62 outside the piston 42 to be outwardly attached on that running part 72 and thus to be kept in place relative to the framework 7. In the example embodiment considered in the figures, this running part 72 delimits, on its upper face, a trough 72.1 for receiving wires 62 outside the piston 42, in which trough those wires run lengthwise between the opposite end parts 71 and 73 of the framework 7. Furthermore, as clearly shown in FIG. 5, the trough 72.1 is provided with at least one raised portion 72.2 that is configured, by itself or jointly with the rest of the trough 72.1, to keep the wires 62 inside the trough 72.1 and thus participate in keeping those wires in place outside the piston 42. Thus, for the example embodiment considered in the figures, the trough 72.1 is provided with several of these raised portions 72.2, which are distributed in the longitudinal direction of the framework 7, and at each of which each wire 62 is transversely jammed between the raised portion and the bottom of the trough 72.1.

Of course, embodiments other than the trough 72.1 and/or the raised portions 72.2 can be considered as long as they consist of arrangements, in particular but not exclusively in terms of shape, of the running part 72 seeking to keep the wires in place outwardly attached on the framework 7 and running along that running part 72.

Figure 6:
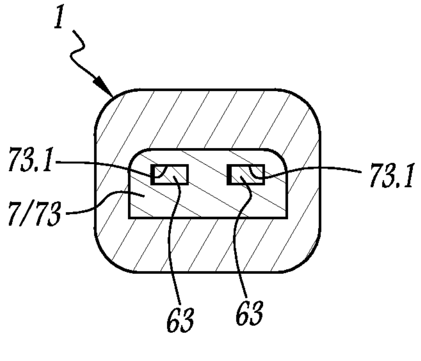

The end part 73 of the framework 7 is advantageously designed to fixedly receive the connecting studs 63. Thus, in the example embodiment considered in the figures and as shown in FIG. 6, this end part 73 is provided with through holes 73.1, in each of which one of the studs 63 is received, in a complementary manner so as to connect the studs 63 and the framework 7 to each other.

Optionally and advantageously, the end part 73 is more openworked than the rest of the framework 7, so as to facilitate access to the electrical connection zone between the ends 65 of the studs 63 and the conductive wires 62: thus, in the example embodiment considered in the figures, the end part 73 is openworked both upwardly and downwardly, while the running part 72 and the opposite end part 71 are only upwardly open, as shown by comparing FIGS. 2 and 3. Thus, in FIG. 3, a downwardly through window, delimited by the end part 73 and upwardly emerging on the connecting zone between the studs 63 and the wires 62, is referenced 73.2.

Furthermore, independently of the immediately preceding considerations, the framework 7 advantageously includes a flexible zone 74 connecting its running part 72 and the end part 73 to each other. In the example embodiment considered in the figures, this flexible zone 74 consists of two parallel strands of material, which each connect the end 73 and running 72 parts to each other and which have respective cross-sections, the sum of which is significantly smaller than the minimum cross-section of the parts 72 and 73. In other words, and more generally, the flexible zone 74 is thinner compared to the rest of the framework 7. It will be understood that, owing to its flexibility, the zone 74 is easily deformable relative to the rest of the framework 7, such that said flexible zone 74 makes it possible to adjust the relative position between the end part 73 and the running part 72. In particular, as an example, the end part 73 can, subject to deformation of the flexible zone 74, extend in an inclined direction relative to the longitudinal direction of the running part 72.

In light of the preceding explanations, it will be understood that the framework 7 is a part making it possible to support the conductive wires 62, for the part of the latter outside the piston 42, said part being designed to cooperate with the piston, the wires 62 and the connecting studs 63 before molding of the housing 1. Furthermore, according to one manufacturing example of the thermostatic valve, the aforementioned components, in other words the piston 42, inwardly equipped with the heating resistance 61 from which the conductive wires 62 extend, the framework 7 and the connecting studs 63 are assembled to one another to form an assembly as shown in FIG. 7. Then, secondly, the housing 1 is molded, more specifically overmolded, around that preassembled assembly. In practice, this means that the aforementioned preassembled assembly is positioned inside a molding mold, inside which the plastic material is injected so as simultaneously to coat the upper terminal part 44 of the piston 42, the framework 7 and the conductive wires 62. More specifically, at the terminal part 44 of the piston 42, the plastic material coats the flared end 45 of the terminal part 44 of the piston 42, as well as the end part 71 of the framework 7: the plastic then spreads inside the piston part 44, covers the upper face of the stepped wall 46, and coats the entire end part 71 of the framework 7, advantageously except for the inner periphery of the lower face of the rim 71.2 of that end part 71, as clearly shown in FIGS. 1, 3 and 4. Likewise, the plastic material coats the entire running part 72 of the framework 7, in particular by spreading on the wires 62 running over that running part 72, inside the trough 72.1. During the injection of the plastic material, the aforementioned wires are kept in place inside the trough 72.1, ensuring that they are reliably coated, without risking pulling them, or even pulling them out.

It will be understood that the plastic material that overmolds the upper terminal part 44 of the piston 42 and the framework 7 and is arranged inside the body 11, molded jointly with the rest of the housing 1, forms the aforementioned arm 14.

Of course, the overmolding of the housing 1 around the framework 7 is also done around the end part 73 of that framework, as clearly shown in FIGS. 1 to 3, in particular coating the electrical connections between the studs 63 and the wires 62. Advantageously, beyond the end part 73, moving away from the axis X-X, the overmolding is done so as to form the connecting base 16 around the free end 64 of the studs 63. Of course, as an alternative that is not shown, before molding the housing 1, the flexible zone 74 of the framework 7 can be deformed so as to modify the relative positioning of the end part 73 with respect to the rest of the framework 7, to adapt to other positional geometries of the studs 63 within the thermostatic valve: the overmolding of the housing 1 then freezes the deformation of the flexible zone 74, by coating.

At the end of molding of the housing 1, the latter is secured to the aforementioned preassembled assembly, by overmolding of the upper terminal part 44 of the piston 42, the framework 7 and the conductive wires 62 outside the piston 42. The valve 1 is then in the configuration shown in FIGS. 1 to 6.

Advantageously, the manufacture of the thermostatic valve ends by attaching a single O-ring 8, which is arranged coaxially around the piston 42, radially interposed between the piston and a part 17 across from the arm 14 of the housing 1, and situated axially upwardly bearing against the rim 71.2 of the end part 71 of the frame 7, as clearly shown in FIGS. 1, 3 and 4. As an alternative that is not shown, the O-ring 8 has a four-lobed shape.

When the thermostatic valve is in use, the piston 42 is pressed against the transverse arm 14 under the action of the thermostatic element 4 and the return spring 5: the corresponding axial stresses are transmitted through the upper face of the stepped wall 46. The first radial dimension of the space guarantees a reliable force transmission, without damaging the arm 14, and more generally, the housing 1. Furthermore, the seal 8 makes the inside of the piston 42 tight with respect to the fluid flowing in the body 11 of the housing 1.

Various arrangements and alternatives to the heating assembly and the thermostatic valve described thus far may also be considered. For example:

in the embodiment described thus far, the single-piece housing 1, which is attached by overmolding, constitutes the entire external housing of the illustrated valve; alternatively, this single-piece housing may correspond only to part of the valve housing, while in particular being provided to be assembled to another ad hoc housing element; and/or in the example embodiment considered in the figures, the tube of the heating cartridge, in which the heating resistance 61 is arranged, constitutes the piston 42 of the thermostatic element 4; for other thermostatic valve construction forms, this tube of the heating cartridge and the piston of the thermostatic element, the thermally expandable material of which is heated by the heating resistance belonging to the heating assembly, may consist of two separate parts; in that case, generally, the tube of the heating assembly extends through the bottom of the cup of the thermostatic element, opposite the piston of that element.

The invention claimed is:

1. A heating assembly for a fluid control thermostatic valve, comprising:

a tube, which is thermally conductive, which has a longitudinal central axis and which is configured to be plunged in a thermally expandable material of a thermostatic element of the valve, the tube having a terminal longitudinal part which includes an outwardly flared end, an electric heating resistance, which is positioned inside the tube and from which electrically conducting wires extend outside the tube, a single-piece housing, which is made from a plastic material, which is configured to permit a fluid to flow therethrough and which is secured by overmolding to the terminal longitudinal part of the tube, and a framework for supporting and keeping in place the conductive wires outside the tube, the framework being separate from the housing and fixedly attached directly to the terminal longitudinal part of the tube, wherein the framework includes a first end part which turns toward the tube and which is elongated in a transverse direction with respect to the central axis, said first end part surrounding and being fastened to the outwardly flared end of the terminal longitudinal part of the tube, and wherein the framework, the conductive wires outside the tube and the terminal longitudinal part of the tube are jointly coated with the plastic material of the housing during molding of the housing.

2. The heating assembly according to claim 1, wherein the framework is made in a single piece.

3. The heating element according to claim 1, wherein the framework further includes a second end part, which turns opposite the tube, and a running part, which extends between the first end part and the second end part of the framework.

4. The heating assembly according to claim 3, wherein, between the second end part and the running part of the framework, the framework comprises a flexible zone configured to be deformed so as to adjust the relative positioning between the second end part and the rest of the framework before molding of the housing.

5. The heating assembly according to claim 3, wherein the second end part of the framework has through holes configured to complementarily receive electrical connecting studs that are respectively electrically connected to the conductive wires before molding of the housing.

6. The heating assembly according to claim 3, wherein the running part of the framework delimits a longitudinal trough which is configured to receive the conductive wires outside the tube, in which the wires run lengthwise between the first and second end parts of the framework and which is provided with a retainer configured to keep in place the conductive wires outside the tube before molding of the housing.

7. The heating assembly according to claim 1, wherein the heating assembly further comprises a single sealing gasket which is both inserted radially between the housing and the tube and arranged axially against the first end part of the framework.

8. A fluid control thermostatic valve, comprising:

a heating assembly according to claim 1, a valve housing consisting at least partially of the housing of the heating assembly, a closure member configured to regulate the flow of a fluid through the valve housing, and a thermostatic element, comprising a stationary part fixedly connected to the valve housing, and a moving part that bears the closure member and is movable relative to the stationary part under the expansion action of a thermally expanding material in which the tube of the heating assembly is plunged.

9. The heating assembly according to claim 1, wherein the first end part of the framework is fastened to the outwardly flared end of the terminal longitudinal part of the tube by cooperating through complementary shapes.

10. The heating assembly according to claim 4, wherein the flexible zone of the framework is thinner with respect to the rest of the framework.

11. The heating assembly according to claim 7, wherein the sealing gasket is an O-ring seal.

12. The heating assembly according to claim 7, wherein the sealing gasket is a four-lobed seal.

13. A heating assembly for a fluid control thermostatic valve, comprising:

a tube, which is thermally conductive, which has a longitudinal central axis and which is configured to be plunged in a thermally expandable material of a thermostatic element of the valve, an electric heating resistance, which is positioned inside the tube and from which electrically conducting wires extend outside the tube, a single-piece housing, which is made from a plastic material, which is configured to permit a fluid to flow therethrough and which is secured by overmolding to a terminal longitudinal part of the tube, and a framework for supporting and keeping in place the conductive wires outside the tube, the framework being separate from the housing and fixedly attached directly to the terminal longitudinal part of the tube, wherein the framework includes a first end part, which turns toward the tube and which is elongated in a transverse direction with respect to the central axis, a second end part, which turns opposite the tube, and a running part, which extends between the first end part and the second end part of the framework, wherein the framework, the conductive wires outside the tube and the terminal longitudinal part of the tube are jointly coated with the plastic material of the housing during molding of the housing, and wherein, between the second end part and the running part of the framework, the framework comprises a flexible zone configured to be deformed so as to adjust the relative positioning between the second end part and the rest of the framework before molding of the housing.

14. The heating assembly according to claim 13, wherein the flexible zone of the framework is thinner with respect to the rest of the framework.

15. The heating assembly according to claim 13, wherein the framework is made in a single piece.

16. A fluid control thermostatic valve, comprising:

a heating assembly according to claim 13, a valve housing consisting at least partially of the housing of the heating assembly, a closure member configured to regulate the flow of a fluid through the valve housing, and a thermostatic element, comprising a stationary part fixedly connected to the valve housing, and a moving part that bears the closure member and is movable relative to the stationary part under the expansion action of a thermally expanding material in which the tube of the heating assembly is plunged.

17. A heating assembly for a fluid control thermostatic valve, comprising:

a tube, which is thermally conductive, which has a longitudinal central axis and which is configured to be plunged in a thermally expandable material of a thermostatic element of the valve, an electric heating resistance, which is positioned inside the tube and from which electrically conducting wires extend outside the tube, a single-piece housing, which is made from a plastic material, which is configured to permit a fluid to flow therethrough and which is secured by overmolding to a terminal longitudinal part of the tube, and a framework for supporting and keeping in place the conductive wires outside the tube, the framework being separate from the housing and fixedly attached directly to the terminal longitudinal part of the tube, wherein the framework includes a first end part, which turns toward the tube and which is elongated in a transverse direction with respect to the central axis, and a second end part, which turns opposite the tube, wherein the framework, the conductive wires outside the tube and the terminal longitudinal part of the tube are jointly coated with the plastic material of the housing during molding of the housing, and wherein the second end part of the framework has through holes configured to complementarily receive electrical connecting studs that are respectively electrically connected to the conductive wires before molding of the housing.

18. The heating assembly according to claim 17, wherein the framework is made in a single piece.

19. A fluid control thermostatic valve, comprising:

a heating assembly according to claim 17, a valve housing consisting at least partially of the housing of the heating assembly, a closure member configured to regulate the flow of a fluid through the valve housing, and a thermostatic element, comprising a stationary part fixedly connected to the valve housing, and a moving part that bears the closure member and is movable relative to the stationary part under the expansion action of a thermally expanding material in which the tube of the heating assembly is plunged.

* * * * *